(12) United States Patent
Case

(10) Patent No.: US 12,729,710 B2
(45) Date of Patent: Sep. 8, 2026

(54) FASTENER RESTRAINT ASSEMBLY TO PREVENT ROTATIONAL LOOSENING OF MECHANICAL FASTENERS, FASTENER AND METHOD

(76) Inventor: Bern Case, Toronto (CA)

( * ) Notice: Subject to any disclaimer, the term of this patent is extended or adjusted under 35 U.S.C. 154(b) by 4530 days.

(21) Appl. No.: 13/009,485

(22) Filed: Jan. 19, 2011

(65) Prior Publication Data

US 2011/0110744 A1 May 12, 2011

Related U.S. Application Data

(62) Division of application No. 11/832,361, filed on Aug. 1, 2007, now Pat. No. 7,896,595.

(51) Int. Cl.
*F16B 39/02* (2006.01)
*F16B 37/14* (2006.01)

(52) U.S. Cl.
CPC .............. *F16B 37/14* (2013.01); *F16B 39/02* (2013.01)

(58) Field of Classification Search
USPC .......... 70/229, 230, 231, 232; 411/128, 138, 411/145, 102, 7, 89, 114, 115
See application file for complete search history.

(56) References Cited

U.S. PATENT DOCUMENTS 1,950,493 A * 3/1934 Johnson .......................... 70/259
4,823,653 A 4/1989 Batten
5,214,832 A 6/1993 Koehler et al.
5,898,229 A 4/1999 Murata et al.
5,951,222 A 9/1999 Gosling
6,338,403 B1 1/2002 Costin et al.
6,390,247 B1 * 5/2002 Drennen ...................... 188/72.8
6,843,627 B2 * 1/2005 Childs et al. ..................... 411/7
6,893,199 B2 5/2005 Michels
6,948,405 B1 9/2005 Simmons
6,976,817 B1 12/2005 Grainger
7,008,158 B2 3/2006 Madden, III
7,101,132 B2 9/2006 Hofschneider

OTHER PUBLICATIONS

"One Way Clutch Bearings at Inner Auto Parts", 2006, Inner Auto Parts, online: <http://www.innerauto.com/Automotive_Definitions/One_Way_Clutch_Bearings/>. Accessed: Oct. 5, 2006.
"Timken-Bearings—Types of Antifriction Bearings", 2006, The Timken Company, online: <http://www.timken.com/products/bearings/fundamen/compare.asp>. Accessed: Oct. 5, 2006.
"RcTek: Model Car Bearing Information—One Way Bearings", RcTek 2000, Information & Resources for the Radio Controlled Model Car Racer, online: <http://www.rctek.com/info_bearings_one_way.htmp>. Accessed: Oct. 5, 2006.

* cited by examiner

*Primary Examiner* — Jason W San

(57) ABSTRACT

An engagement fitting attaches to a rotational fastener, and is anchored to a point stationary relative to the fastener. A rotational coupling attaches the engagement fitting to an anchor member, allowing uni-directional rotation of said engagement fitting on the rotational fastener, relative to the anchor member, about the fastener axis, in a loosening direction of said rotational fastener, to prevent self-loosening of the fastener.

9 Claims, 14 Drawing Sheets

112a
122
136
138
128
132
130
116
140
146
142
144

246
238
232
236a
290
230
236b
228
226
224
222
260

464
410
412
404
406
490
492
434
414
434
400

FASTENER RESTRAINT ASSEMBLY TO PREVENT ROTATIONAL LOOSENING OF MECHANICAL FASTENERS, FASTENER AND METHOD

CROSS-REFERENCE TO RELATED APPLICATIONS

This application is a divisional of U.S. patent application Ser. No. 11/832,361 filed Aug. 1, 2007 now U.S. Pat. No. 7,896,595, the contents of which are hereby incorporated by reference.

FIELD OF THE INVENTION

The present invention relates generally to mechanical fasteners, and more particularly to a fastener restraint assembly and method, that may prevent rotational loosening of mechanical fasteners, such as bolts, nuts and screws.

BACKGROUND OF THE INVENTION

Mechanical fasteners, such as bolts, nuts and the like once set, may loosen due to vibrations or thermal expansion or contractions. This phenomenon is often referred to as "self loosening".

Several approaches of preventing self loosening, thereby locking fasteners set to an axial preload are known. For example, lock washers may be used to increase the frictional forces between a fastener and its underlying substrate. However, with time, and external forces fasteners secured by lock washers may also loosen, and may undesirably damage or scour the underlying substrate. As such, lockwashers have fallen out of favour in the fastener industry.

Another approach is to apply a chemical adhesive. However, lubricants can typically not be used with such chemical adhesives, making precise pre-loading difficult, if not impossible. Further, such chemical adhesives are sensitive to contaminants; have a limited shelf-life; and need to be re-applied periodically. While high strength chemical adhesives may be effective when properly selected and applied, they must typically be heated to very high temperatures to allow removal/loosening of fasteners. While fasteners installed with low to mild strength to mid-strength adhesives may be disassembled by hand, they may allow self-loosening with time.

Other approaches rely on using a deformed fastener that locks as a result of its deformation. As a result, torque applied to the fastener creates an axial load on the fastener and deforms the locking mechanism, and the axial preload load on the fastener is somewhat less than it would be in the absence of the locking mechanism. How much less will depend on the force required to deform the locking mechanism, and this amount may not readily be known or be repeatable with accuracy. Further, deformation may waken the fastener.

Still yet another approach uses a castellated nut, and cotter pin, with a complementary hole drilled through the threaded fastener after the nut has been set to the desired load. This, however, requires the fastener to be accessible, typically to a drill, and may be labour intensive requiring substantial skill. Further, clearance around the pin may allow play between the fastener and pin resulting in pin failure.

Another approach uses a lockwire passed through transverse holes in at least two threaded fasteners and twisted back on itself in a specific pattern. Again, lockwiring is labour intensive, time consuming and requires significant expertise in proper routing of the wires. Often the quality of lockwiring is unsatisfactory due to unintended variations in the taughtness of the twists and the tension on the lockwires. When wired incorrectly, a lockwire may actually advance or even initiate self loosening of the fasteners.

Still other approaches rely on specific fasteners that have locking heads that lock in a particular orientation. Such fasteners may be set to an initial specific pre-load, and then further tightened or loosened to move the head into its locking orientation. However, the resulting load used to achieve the locking orientation may not correspond to the desired pre-load.

Thus, there remains a need for a positive-locking fastener that achieve a desired axial preload.

SUMMARY OF THE INVENTION

Exemplary of the present invention, an engagement fitting attaches to a rotational fastener, and is anchored to a point stationary relative to the fastener. A rotational coupling attaches the engagement fitting to an anchor member, allowing uni-directional rotation of said engagement fitting on the rotational fastener, relative to the anchor member, about an axis parallel to the fastener axis, to prevent self-loosening of the fastener.

In accordance with an aspect of the present invention, there is provided a fastener restraint assembly comprising: an engagement fitting for engaging a rotational fastener. The rotational fastener rotates about a fastener axis. The engagement fitting is mountable to the rotational fastener after the rotational fastener has been tightened to a desired torque. The fastener restraint assembly further comprises an anchor member, attachable to a point that is stationary relative to the fastener; and a rotational coupling attaching the engagement fitting to the anchor member, allowing uni-directional rotation of the engagement fitting relative to the anchor member, about an axis parallel to the fastener axis, to allow rotational alignment of the engagement fitting and to prevent rotation of the engagement fitting and rotational fastener once the engagement fitting has been mounted on the rotational fastener and the anchor member has been mounted to the stationary point.

In accordance with another aspect of the present invention, there is provided a fastener. The fastener comprises: a threaded shaft portion, for fastening the fastener, as the fastener is rotated about a fastener axis; a shaft stub, extending from the shaft portion and coaxial therewith; a rotational coupling on the shaft stub, the rotational coupling for attachment to an anchor member, the rotational coupling allowing uni-directional rotation on the fastener, relative to the anchor member, about the fastener axis, in a loosening direction of the fastener.

In accordance with yet another aspect of the present invention, there is provided a method of restraining a rotational fastener, the rotational fastener rotatable about a fastener axis. The method comprises:

a. tightening the rotational fastener to a desired torque;
b. after tightening the rotational fastener to the desired torque., mounting an engagement fitting to the rotational fastener, the engagement fitting comprising a rotational coupling allowing uni-directional rotation of the engagement fitting relative to an anchor member about an axis parallel to the fastener axis, in a tightening direction of the rotational fastener;
c. attaching the engagement fitting to the anchor member; and d. attaching the anchor member to a point that is stationary relative to the fastener.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
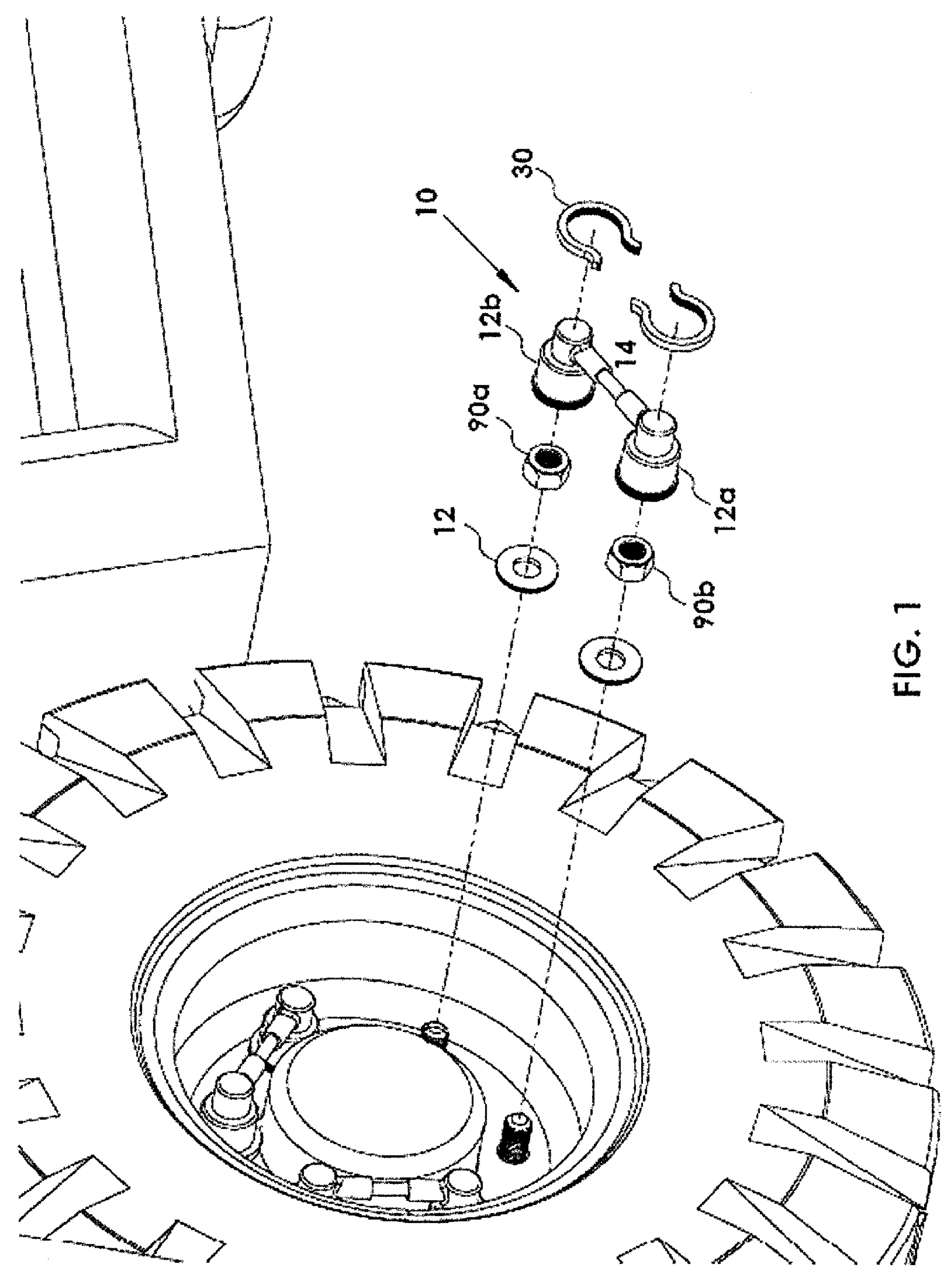
FIG. 1 is a perspective view of fastener restraint assembly, exemplary of an embodiment of the present invention.
Figure 2:
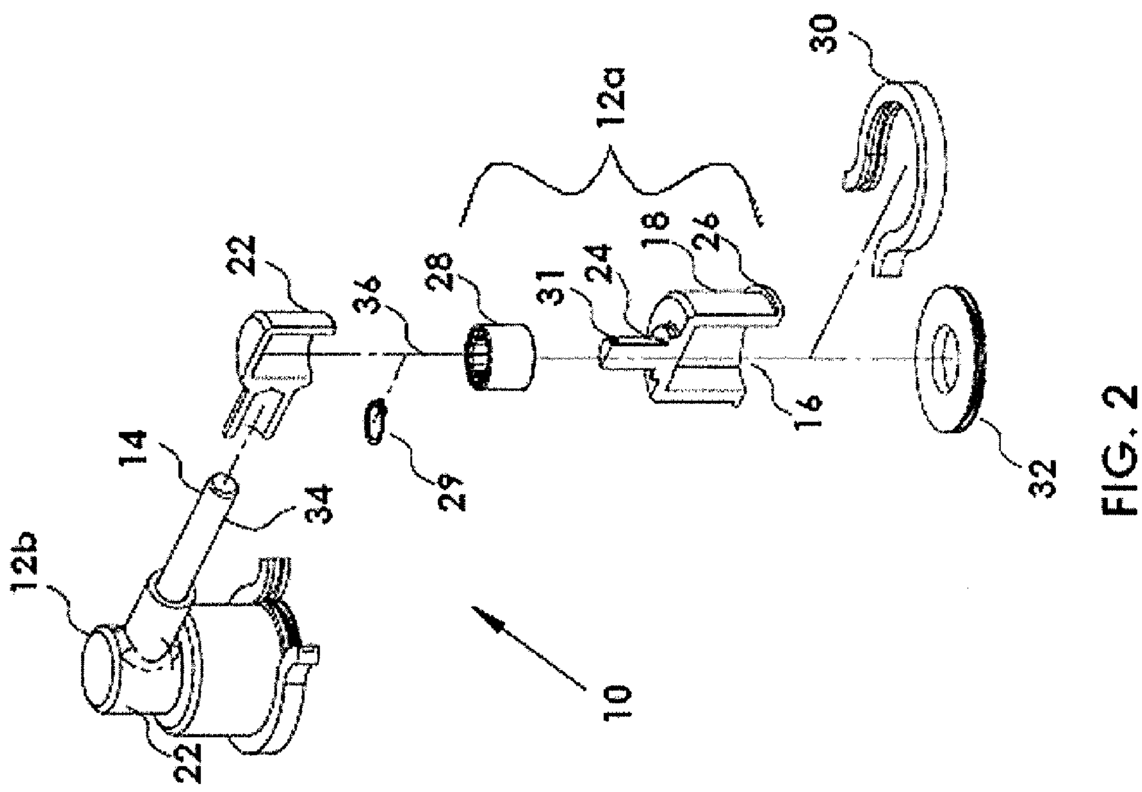
FIG. 2 is a partially exploded view of the fastener restraint assembly of FIG. 1.
Figure 3:
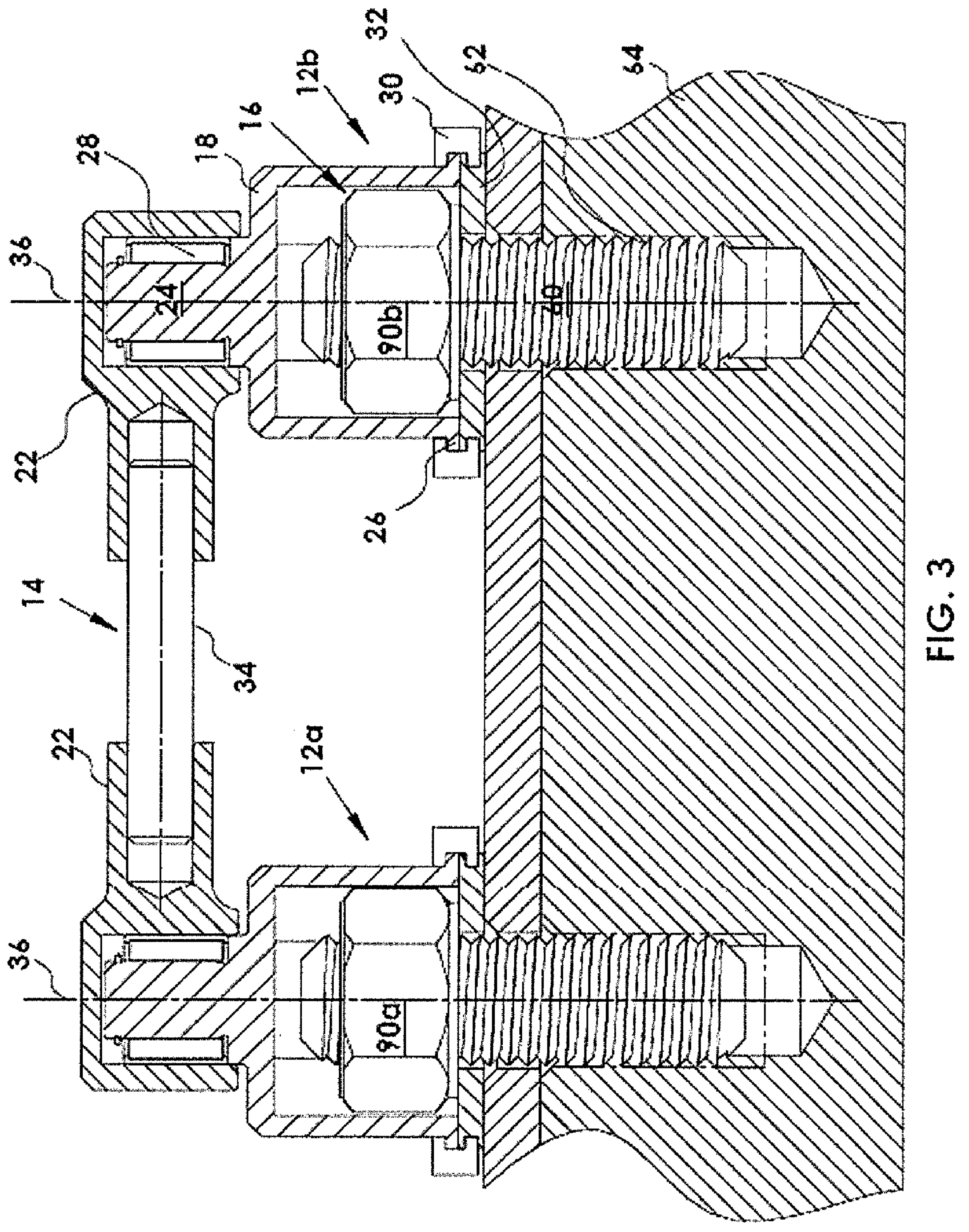
FIG. 3 is a cross-sectional view of the fastener restraint assembly of FIG. 1, in use.

Exemplary of embodiments of the present invention, a fastener restraint assembly 10 is illustrated in FIGS. 1-3. As best illustrated in FIG. 1, fastener restraint assembly 10 is suitable for preventing the self-loosening of one or more rotational fasteners 90*a*, 90*b* (individually and collectively fasteners 90), such as a bolt, nut, or the like. Fastener restraint assembly 10 engages a fastener 90 after fastener 90 has been tightened against substrate 64 to a desired pre-load. As for example depicted in FIGS. 1 and 3, fastener restraint assembly 10 may be used to secure the nut fasteners that retain a wheel to a hub.

As illustrated in FIGS. 1, 2 and 3, fastener restraint assembly 10 includes two fastener engagement heads 12*a* and 12*b* (individually and collectively engagement heads 12), and an anchor member 14, connecting engagement heads 12.

Each engagement head 12 includes an engagement fitting 16, complementary to the fastener 90 to be restrained. In the depicted embodiment, engagement fitting 16 is formed as a six-sided (hex) socket, complementary to a nut fastener 90 to be rotationally restrained. As will become apparent, engagement fitting 16 may take on a variety of shapes, in dependence on the fastener(s) to be restrained. For example, engagement fitting 16 could be formed as a four sided socket for engaging square headed fastener; a six or twelve point socket for engaging Torx type fasteners; a custom fitting for engaging a tamper proof head; or the like.

Engagement fitting 16 may be formed as a housing 18 of engagement head 12 or it may be formed otherwise, as for example a sleeve fixed within a housing, like housing 18. Housing 18 and engagement fitting 16 may be formed of any suitable material, having sufficient strength to restrain fastener 90. For example, housing 18 and engagement fitting 16 may be formed of any suitable metal or non-metal. For example, housing 18 and engagement fitting 16 may be formed of steel or alloy.

In any event, engagement fitting 16 extends from anchor member 14 so that anchor member 14 and engagement fitting 16 allow for uni-directional rotation relative to each other, about an axis generally parallel to the axis of rotation of the fastener to be restrained (i.e. about an axis generally parallel to the axis 36 of rotation of the fastener 90).

To this end, a uni-directional rotational coupling 28 illustrated in FIG. 2, connects anchor member 14 to each engagement head 12. As illustrated, anchor member 14 may include a rigid rod 34 that terminates in a housing 22 at each end, to receive rotational coupling 28. The length of rod 34 is chosen so that the distance between engagement fittings 16 exactly equals the distance between two fasteners 90, to be restrained. Rod 34 may be formed of suitably rigid material, such as steel, alloy, reinforced plastics, or the like.

Each housing 18 further includes a nib 24 that engages rotational coupling 28. Each housing 18 also includes a flange 26, extending around the periphery of its lower opening. As described below, this, in turn, allows housing 18 to be fixed to atop fasteners 90 to be restrained, by way of a clip or other fastener. Engagement fitting 16 is thus retained in engagement with an associated fastener 90.

A clip 29, engages an annular groove 31 in nib 24, to retain rotational coupling 28 on nib 24. An outer annalus of rotational coupling 28 is pressed into housing 22, and thereby retained.

Anchor member 14 extends to a point of restraint. In the depicted embodiment of FIGS. 1-3 anchor member 14 extends between two engagement heads 12, with one fastener 90*a* acting as the point of restraint for another engagement head 12*b* attached to an adjacent fastener 90*b*.

Now, rotational couplings 28 permit one directional rotation of housing 22 on fastener 90—in the loosening direction of fastener 90. Thus, if fasteners 90 have a right hand thread (i.e. for tightening in a clockwise direction), rotational couplings 28 allow for free rotation in a counter-clockwise direction on fastener 90. On the other hand, rotation in the opposite direction is not possible. In this way, engagement fitting 16 may be rotated relative to anchor member 14 in much the same way as a socket head may be rotated relative to an attached socket wrench handle. Of course, if fasteners 90 have a left hand thread, coupling 28 allows free rotation in the clockwise direction, and not in the counter-clockwise direction.

Each rotational coupling 28 may for example be formed as a roller clutch, such as a drawn cup needle roller clutch, having a plurality of individually rotatable needles allowing free one directional rotation of engagement fitting 16, relative to anchor member 14. Suitable rotational clutches are for example available from Timken Corporation. Alternatively, coupling 28 may be formed as a ratchet and pawl, a detent mechanism, or otherwise.

A retaining clip 30 may be used to attach each engagement head 12 atop a fastener 90 to be restrained. Retaining clip 30 may be generally C-shaped, formed of stressed steel or similar material, and sized to circumferentially engage flange 26 and a complementary washer 32. A washer having a diameter equal to that of flange 26 may be positioned under fastener 90. The washer may have an annular notch so that its diameter at the base of the notice is equal to the diameter of housing 18 at the base of flange 26.

In operation, fasteners 90 to be restrained are tightened to a desired pre-load, by way of a conventional wrench or other tightening method. Prior to tightening, washer 32 may be placed beneath each fastener 90. In the depicted embodiment, fasteners 90 engage a threaded shaft 60 (FIG. 3). Shaft 60 engages a tapped hole 62 in a substrate 64. Shaft 60 could similarly engage a second retaining nut (not shown), below a thinner substrate.

In any event, once fastener 90 has been tightened, fastener restraint assembly 10 may be placed atop, and connected to two adjacent fasteners 90. Specifically, one engagement head 12*a*, 12*b* is placed atop a respective fastener 90*a*, 90*b*.

In order to rotationally align engagement fittings 12, to torqued fasteners 90, engagement fittings 16 may be freely rotated in one direction, relative to anchor member 14, until they are angularly aligned with fasteners 90*a*, 90*b*. By mounting and rotating engagements fittings 16 to engage two fasteners 90*a* and 90*b*, anchor member 14 is attached to a point that is stationary relative to both fasteners 90*a* and 90*b*.

Once atop fasteners 90 and aligned thereto spring clips 30 may be slid around flanges 26 and washer 32 to lock fastener restrain assembly 10 atop washers 32 under two adjacent fasteners 90*a*, 90*b*, as best viewed in FIG. 3. As engagement fittings 16, once anchored, may not rotate with fasteners 90 in the loosening direction of fasteners 90, fastener restraint assembly 10 restrains loosening rotation of fasteners 90. In particular, as fasteners 90 rotate or otherwise vibrate on substrate 64, fastener restraint assembly 10 provides clockwise torque sufficient to prevent loosening of fasteners 90.

Conveniently, free rotation of engagement fittings 16 relative to anchor member 14 in one direction allows careful alignment of engagement fitting 16 on fasteners 90, with limited rotational play, thereby allowing fasteners 90 to be tightened to exacting standards, and then retained by engagement fitting 16.

Figure 4:
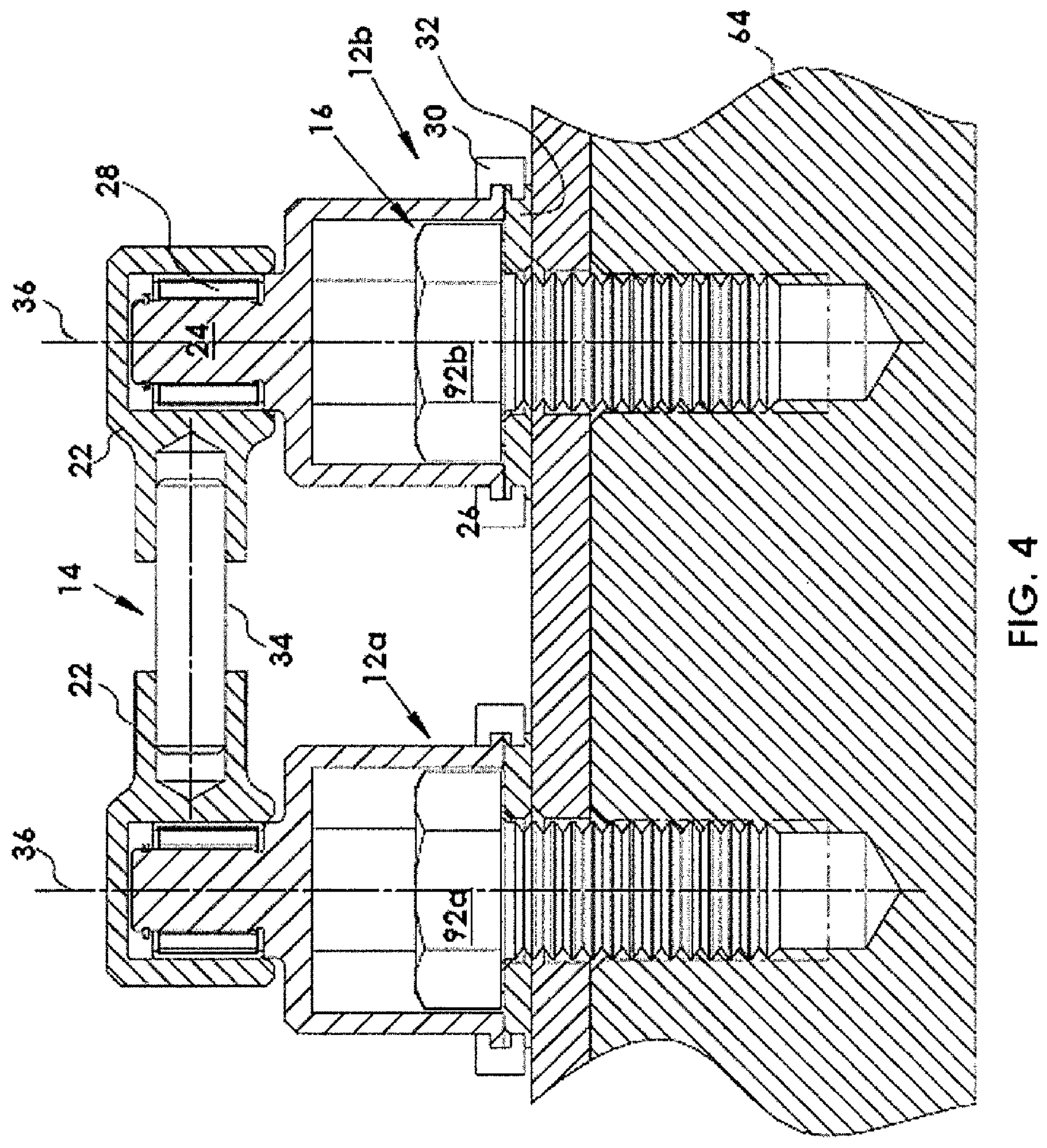
FIG. 4 is a further cross-sectional view of the fastener restraint assembly of FIG. 1, in use.

As will now be appreciated, fastener restraint assembly 10 need not engage nut fasteners 90, but could instead be used to retain hex headed screws, such as screws 92, as depicted in FIG. 4. As will be appreciated engagement heads can be sized to suit any variety of fasteners such as fasteners 90 in the form of nuts, and screws 92.

Figure 5:
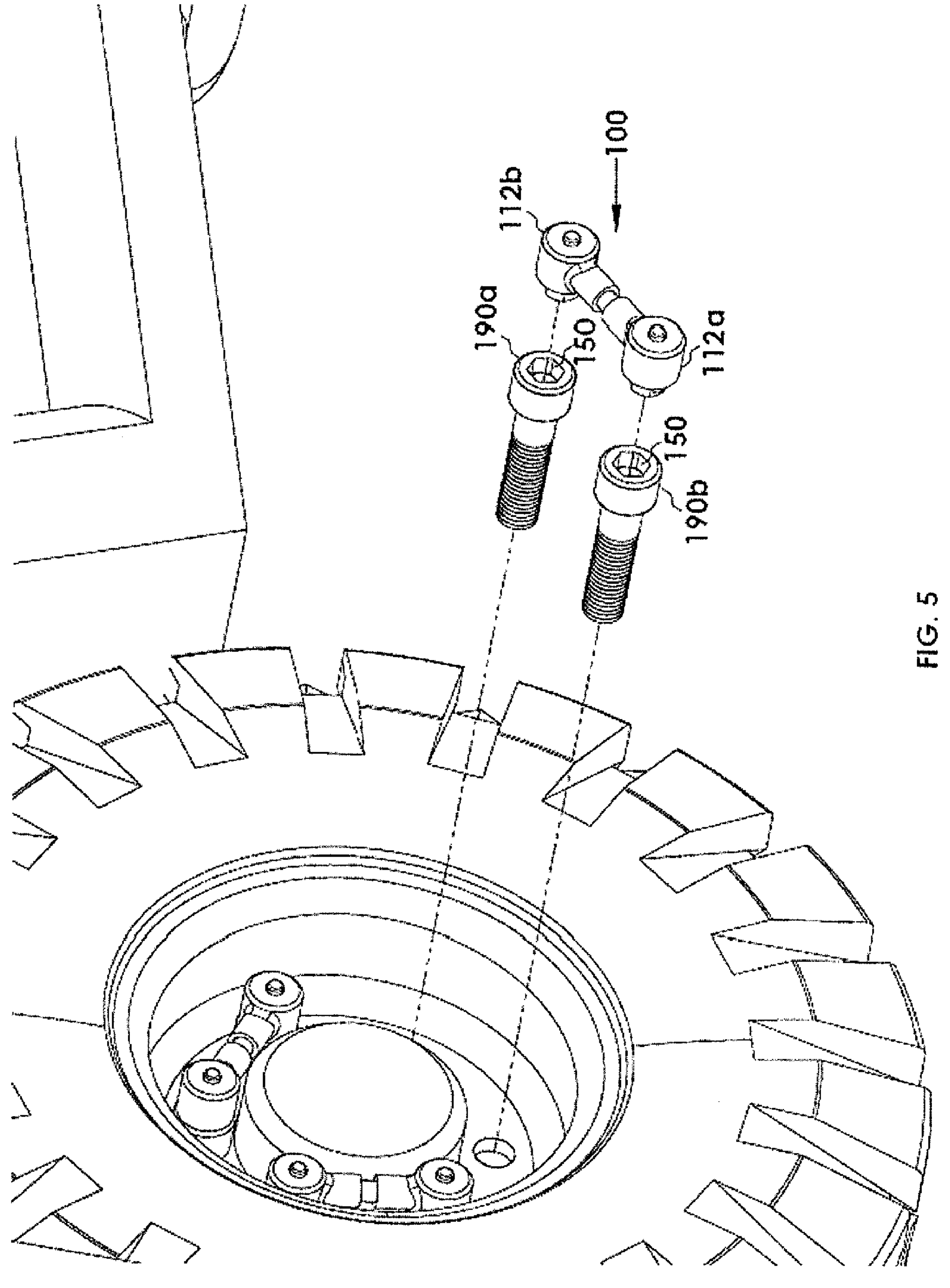
FIG. 5 is a perspective view of fastener restraint assembly, exemplary of a second embodiment of the present invention.
Figure 6:
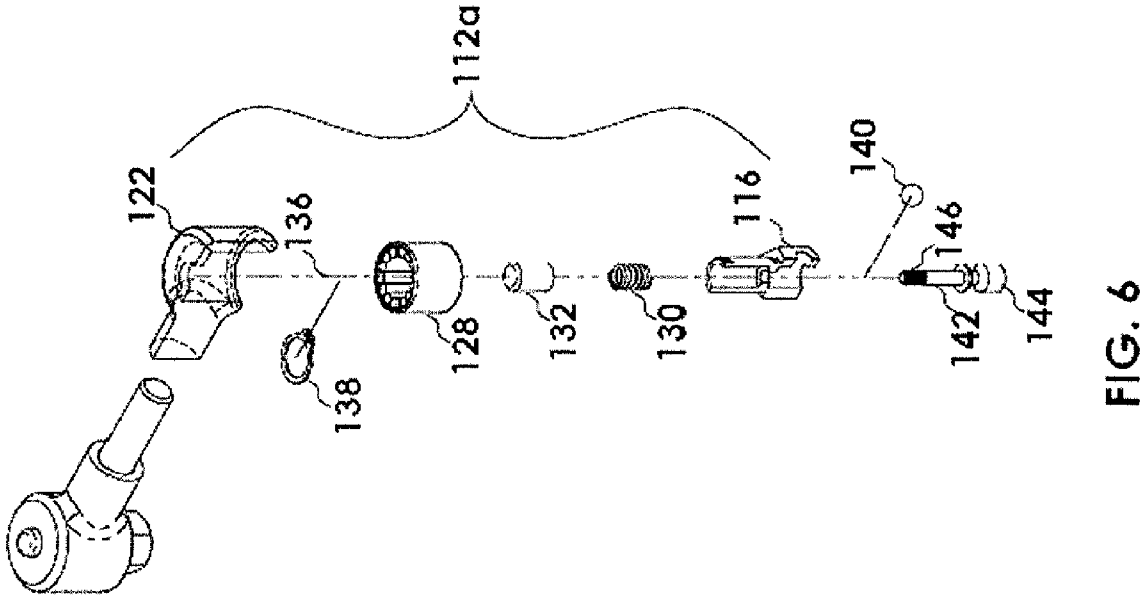
FIG. 6 is an exploded view of one of the fastener restraint assembly of FIG. 5.
Figure 7:
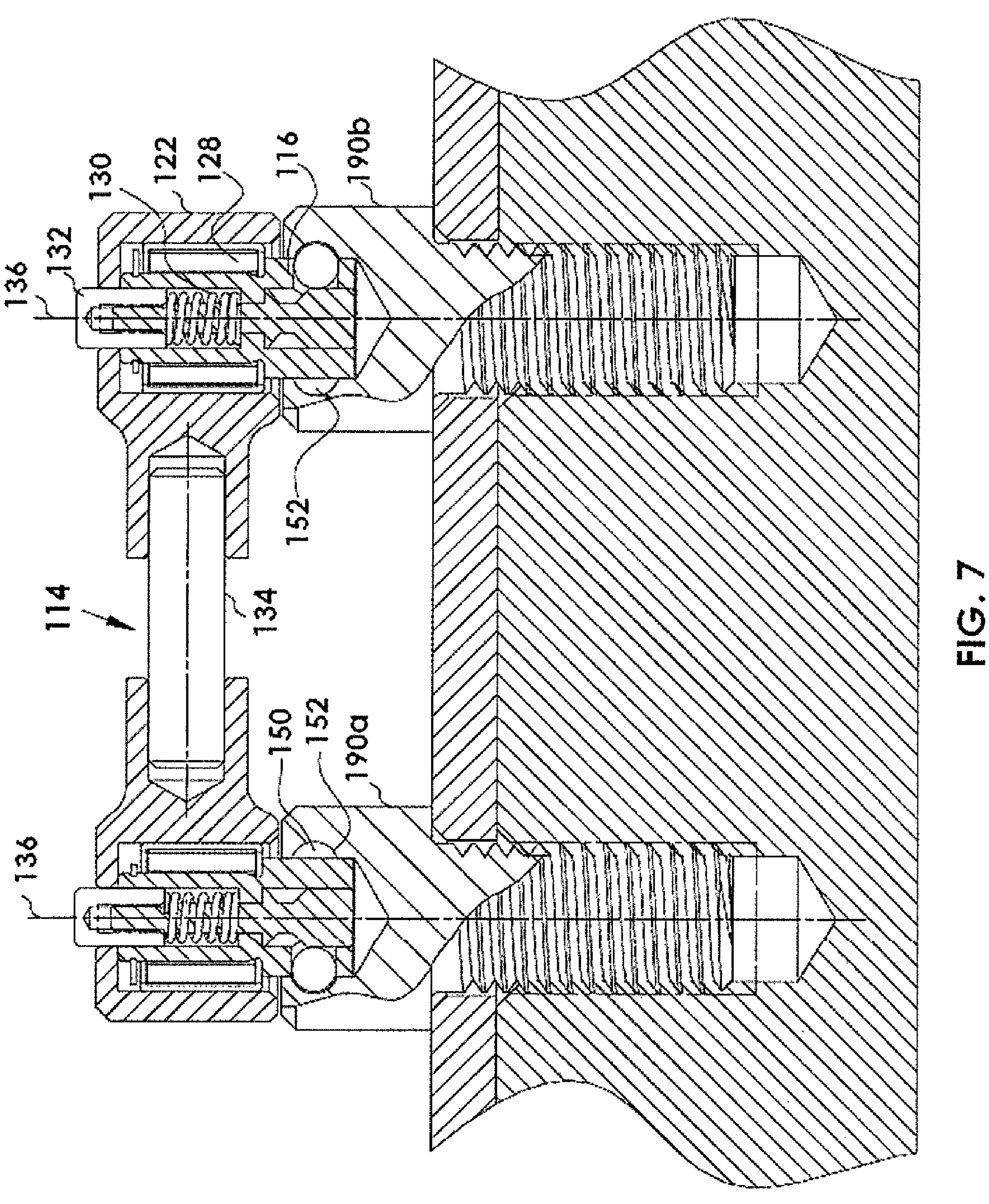
FIG. 7 is a cross-sectional view of a fastener restraint assembly of FIG. 5, in use.

Similarly, in alternate embodiments, engagement head 12 may be replaced to engage other types of fasteners. To this end, an alternate fastener restraint assembly 100, exemplary of another embodiment of the present invention is depicted in FIGS. 5-7. Fastener restraint assembly 100 is suited to engage the sockets of fasteners 190*a* and 190*b* (individually and collectively fasteners 190). In this case, the sockets are hex sockets. However, the sockets could similarly have four, eight, or another number of faces.

As illustrated fastener restraint assembly 100 includes two fastener engagement heads 112*a* and 112*b* (individually and collectively engagement heads 112)—like engagement heads 12, and an anchor member 114 (like anchor member 14 of FIGS. 1-3), connecting engagement heads 112.

Each fastener engagement head 112 includes an engagement fitting 116, complementary to fasteners 190 to be restrained. In the depicted embodiment, engagement fitting 116 is formed as a hex key, having a positive ball detent.

The ball detent includes protrusion 140 that is spherical or semi-spherical and plunger 142 that is resiliently biased within a hollow retaining cavity formed about axis 136 within engagement fitting 116. Plunger 142 has a tip 144 extending from a shaft 146, narrower than this tip 144. Shaft 146 terminates in a thread that may engage a generally cylindrical cap 132. A resilient element 130, in the form of a helical spring, rests between the bottom of cap 132, and a bottom wall of the cavity retaining plunger 142 in engagement fitting 116. Resilient element 130 thus biases plunger 142 upwardly. Upward vertical motion of plunger 142 causes tip 144 to engage the rear of spherical protrusion 140, forcing it in a direction away from axis 136.

Anchor member 114 extends to a point of restraint. In the depicted embodiment of FIGS. 5-7 anchor member 114 extends between two engagement heads 112, with one fastener 190*a* acting as the point of restraint for another engagement head 112*b* attached to an adjacent fastener 190*b*. Anchor member 114 may include a rigid rod 134 that terminates in a housing 122 at each end, to receive rotational coupling 128 and engagement fitting 116. Again, the length of rod 134 is chosen so that the distance between engagement fittings 116 equals the distance between two fasteners 190, to be restrained.

Rotational coupling 128, visible in FIGS. 6 and 7 attaches each engagement fitting 116 to anchor member 114, to allowing engagement fittings 116 to rotate about axes 136 generally parallel to the axes of rotation of fasteners 90. Rotational couplings 128, like coupling 28 (FIGS. 1-3), permit one directional rotation of engagement fitting 116 relative to anchor member 114. Again, rotation in the opposite direction, relative to anchor member 114 is not possible. In this way, engagement fittings 112 allow rotation relative to anchor member 114 in much the same way as a socket head may be rotated relative to an attached socket wrench handle. Each rotational coupling 128 may be formed in the same way as rotational coupling 28.

Rotational coupling 128 is retained about engagement fitting 116 in housing 122 by a clip 138 that engages an annular groove 148 near the top end of engagement fitting 116.

Complementary fasteners 190, has a hex socket 150 that includes one or more dimples 152 complementary to protrusion 140, for engaging protrusion 140, thereby locking engagement fitting 116 to fastener 190 to prevent motion along axis 136. Dimples 152 may be formed in each sidewall of socket 150, at a depth corresponding to the distance of height of protrusion 140 on engagement fitting 116.

In operation, fasteners 190 to be restrained are tightened to a desired pre-load using conventional methods. The desired pre-load may, for example, be pre-determined and measured using a conventional torque wrench. Once tightened, fastener restraint assembly 100 may be placed and connected to two fasteners 190.

Specifically, one engagement fitting 112*a*, 112*b* is placed atop a respective fastener 190*a*, 190*b*, with engagement fitting 116 within socket 150. As engagement fitting 116 is placed within socket 150, cap 132 may be pressed downward, allowing protrusion 140, to move inward toward axis 136.

Once completely inserted within socket 150, cap 132 may be released and protrusion 140 is received within dimple 152, and biased into engagement with dimple 152 by the downward force on tip 144, exerted by resilient element 130.

Again, in order to rotationally align engagement heads 112, to torque fasteners 190, engagement heads 112 may be freely rotated in one direction, relative to anchor member 114, until they are angularly aligned with sockets of fasteners 190*a*, 190*b*.

As engagement heads 112 may not rotate in the loosening direction of fasteners 190 (e.g. counter-clockwise, in the case of a right hand threaded fastener), fastener restraint assembly 100 restrains loosening rotation of fasteners 190. Once again, free rotation of engagement heads 112 in the tightening direction of fasteners 190 allows careful alignment of engagement head 112 on fasteners 190, with limited rotational play.

Figure 8:
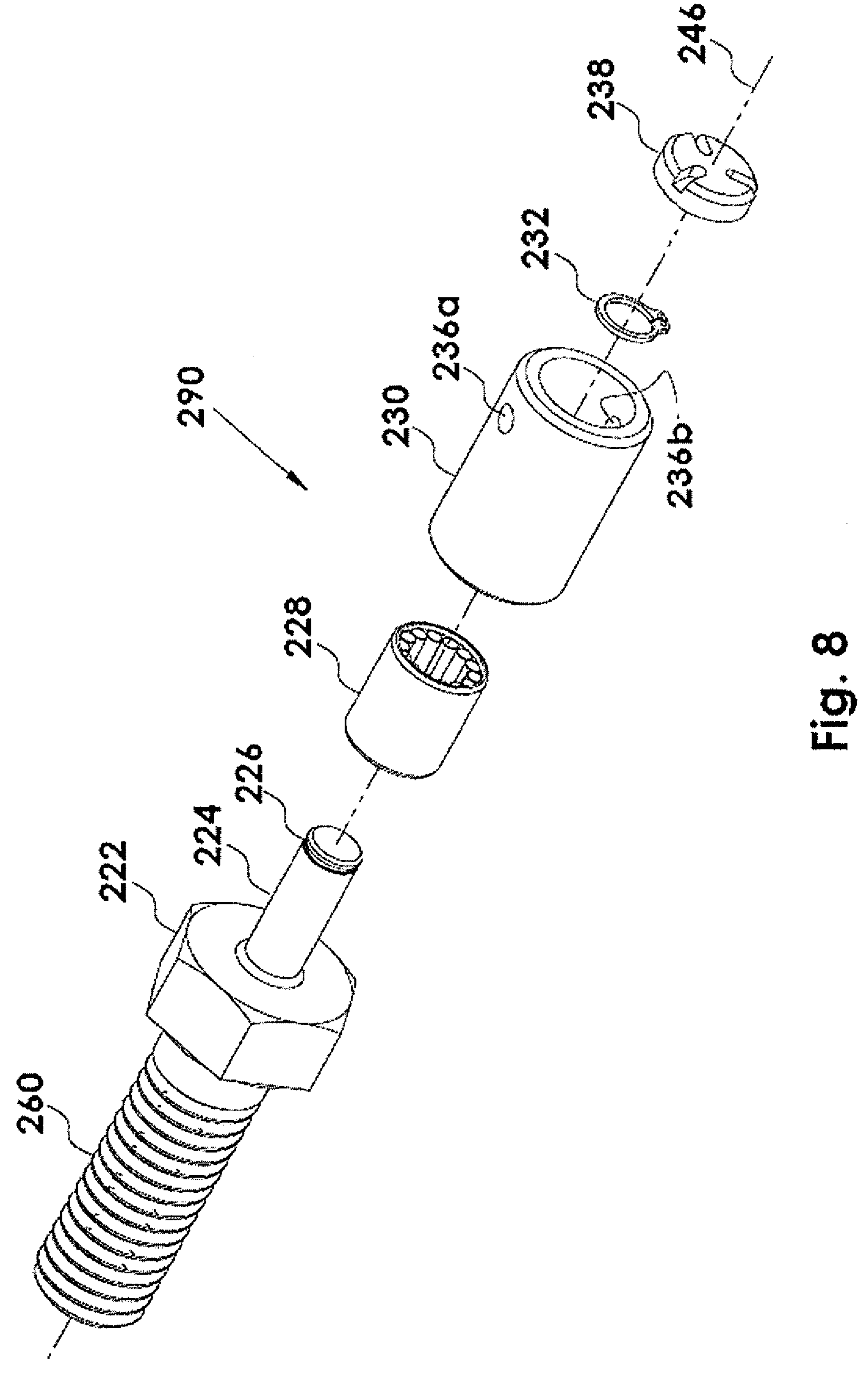
FIG. 8 is an exploded view of a fastener, exemplary of an embodiment of the present invention.
Figure 9:
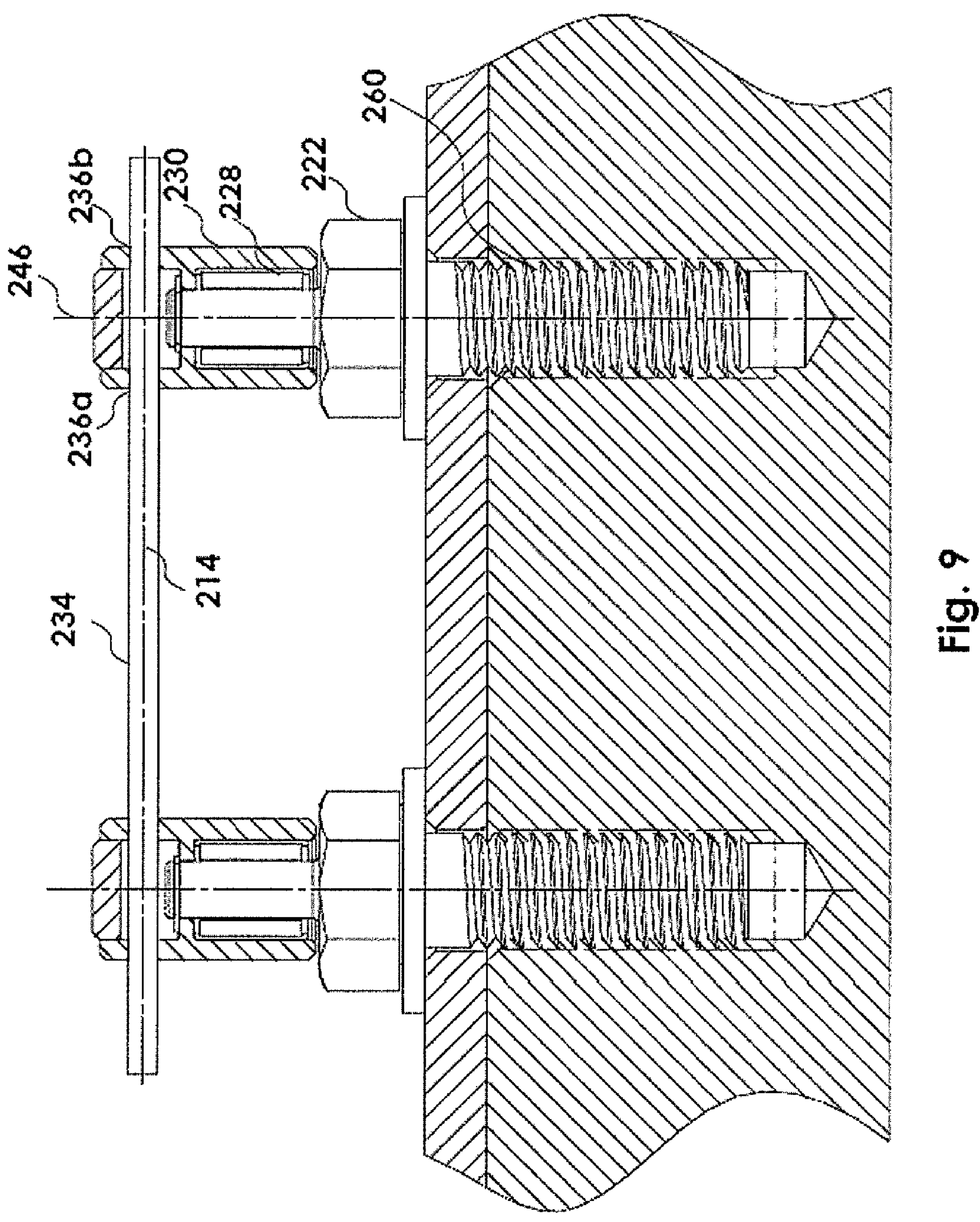
FIG. 9 is a cross-sectional view of the fastener of FIG. 8, in use.

In a further embodiment, depicted in FIGS. 8-9 a fastener 290, includes a threaded shaft 260, a hexagonal head 222 and a generally cylindrical shaft stub 224 extending upwardly from a hexagonal head 222. Shaft stub 224 includes an annular groove 226, extending peripherally around shaft stub 224, near its top end. Fastener 290 further includes a rotational coupling 228 (like coupling 28—FIG. 1) mounted about shaft stub 224, and covered by an external annular housing 230. Annular housing 230 is retained on shaft stub 224 by clip 232 that engages groove 226 proximate the top of shaft stub 224. A cap 238 may optionally further cap the top of annular housing 230. Housing 230 further includes two opposed radially extending holes 236*a*, 236*b* (individually and collectively holes 236), at a point above the end of shaft 224.

Rotational coupling 228 allows one directional rotation of housing 230 relative to shaft 226, about axis 246. Thus, once assembled, housing 230 may rotate freely in the loosening direction of threaded shaft 260, but does not rotate relative to threaded shaft 260, in the tightening direction of shaft 260.

As illustrated, in FIG. 9, fastener 290 may be rotationally restrained using an anchor member 214 formed as a rod 234 that may engage holes 236 in housings 230 of two adjacent fasteners 290, by press fit, or otherwise.

In operation, fasteners 290 (including housing 230 and rotational coupling 228) to be restrained are tightened to a desired pre-load, by hex fitting 222. The desired pre-load may, for example, be pre-determined and measured using a conventional torque wrench. Once tightened, housing 230 may be freely rotated in the loosening direction of threaded shaft 260 about axis 246. Now, housings 230 of two adjacent fasteners may be rotated so that holes 230 of both housings are aligned. Once aligned a rod 234 may then be slid through holes in both fasteners. Once inserted, rod 234 will prevent rotation of housings 230 in the loosening direction.

As should now be apparent, the embodiments of FIGS. 1-9 allow an anchor member 14, 114 and 214 to be fixed between two fasteners 90, 190, and 290, thereby attaching each fastener to a point that is stationary relative to the fastener being restraint. Alternate anchor members (not shown) may be affixed between three or more fasteners, or otherwise to a point stationary relative to fasteners 90, 190, or 290.

Figure 10:
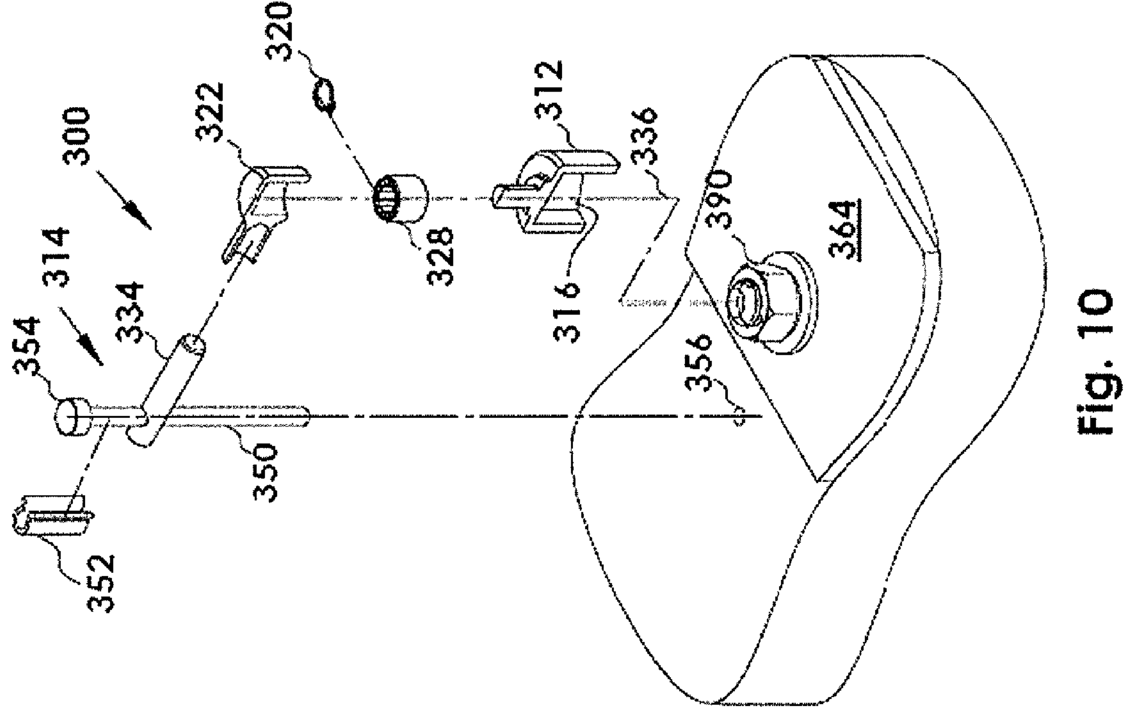
FIG. 10 is an exploded view of a fastener restraint assembly exemplary of a further embodiment of the present invention.
Figure 11:
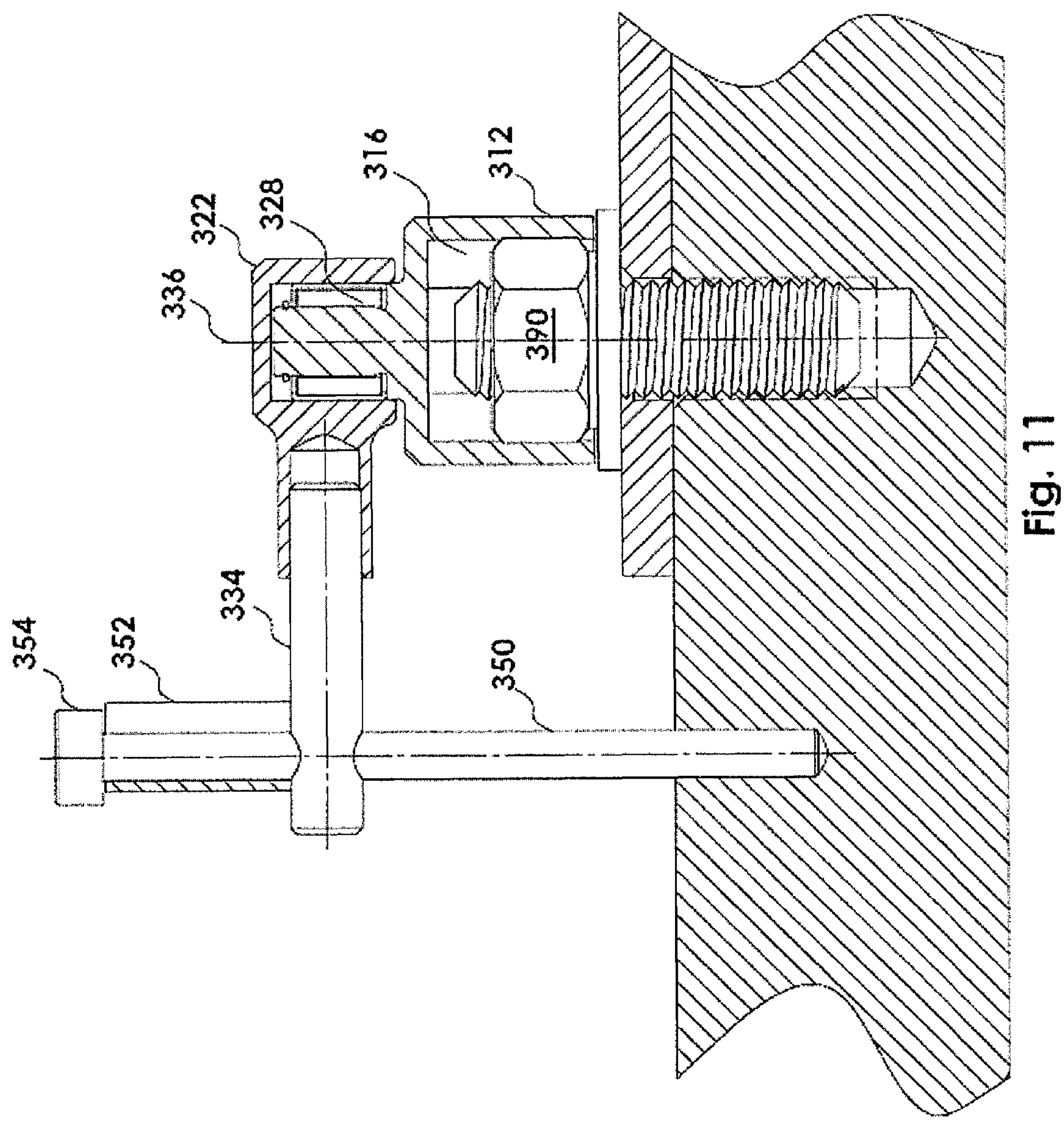
FIG. 11 is a cross-sectional view of a fastener restraint assembly of FIG. 10, in use.

In yet a further alternate embodiment depicted in FIGS. 10 and 11, a fastener restraint assembly 300 includes an anchor member 314 that may be affixed to another point that remains stationary relatively to fastener 390 to be restrained. Fastener restraint assembly 300 includes an engagement head 312, engagement fitting 316, interconnected by a rotational coupling 328 retained by clip 330 in housing 322, in much the same way engagement head 12, engagement fitting 16, rotational coupling 28, clip 29, and housing 22 (FIGS. 1-3) are formed and interconnected. As a consequence, engagement fitting 316 may rotate in a single direction relative to anchor member 314, about axis 336.

Anchor member 314, unlike anchor member 14 (FIG. 1-3) is fixed directly to the substrate to which fastener 390 is mounted. To this end, anchor member 314 includes a rod 334 having a component extending normal to the axis 336 of rotation of fastener 390. A further pin 350 extends downwardly from rod 334 in a direction parallel to axis 336. Rod 334 may move up and down freely on pin 350, restrained only by a head 354 at the top end of pin 350. Pin 350 may be fixed within hole 356 in a surface of substrate 364 that is stationary relative to fastener 390. Pin 350, for example, be pressed, welded or otherwise restrained on substrate 364. A clip 352 that engages the periphery of pin 350 keeps rod 334 and thus engagement head 312 in a fixed position relative to the length pin 350, keeping it atop fastener 390, as illustrated in FIG. 11.

Figure 12:
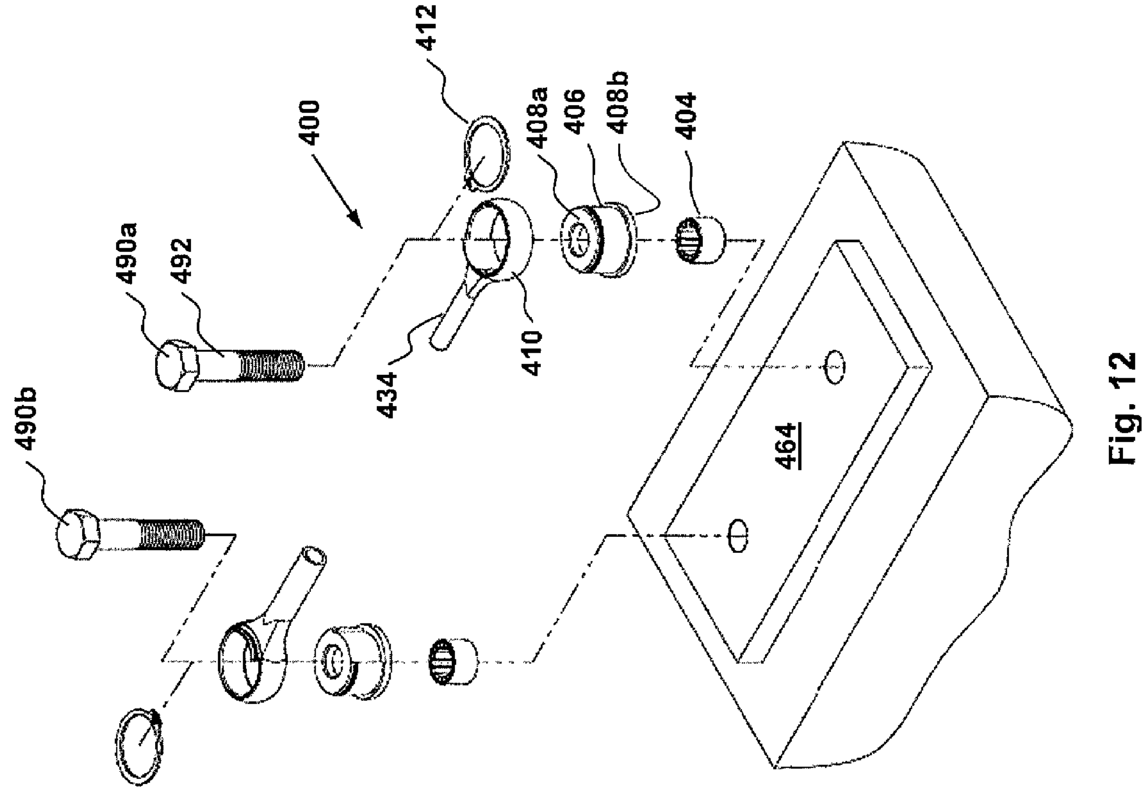
FIG. 12 is an exploded view of a fastener restraint assembly, exemplary of yet another embodiment of the present invention.
Figure 13:
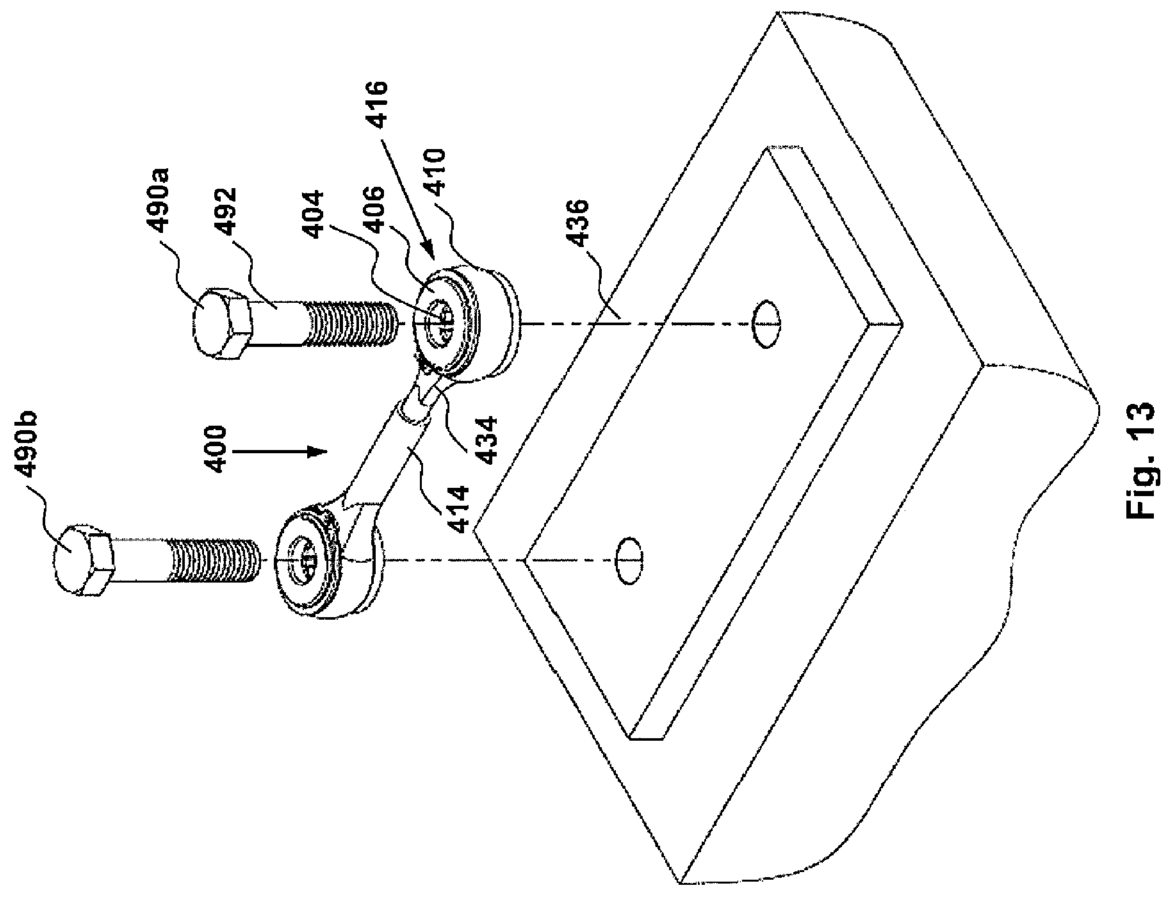
FIG. 13 is a perspective view of a fastener restraint assembly of FIG. 12, in use.
Figure 14:
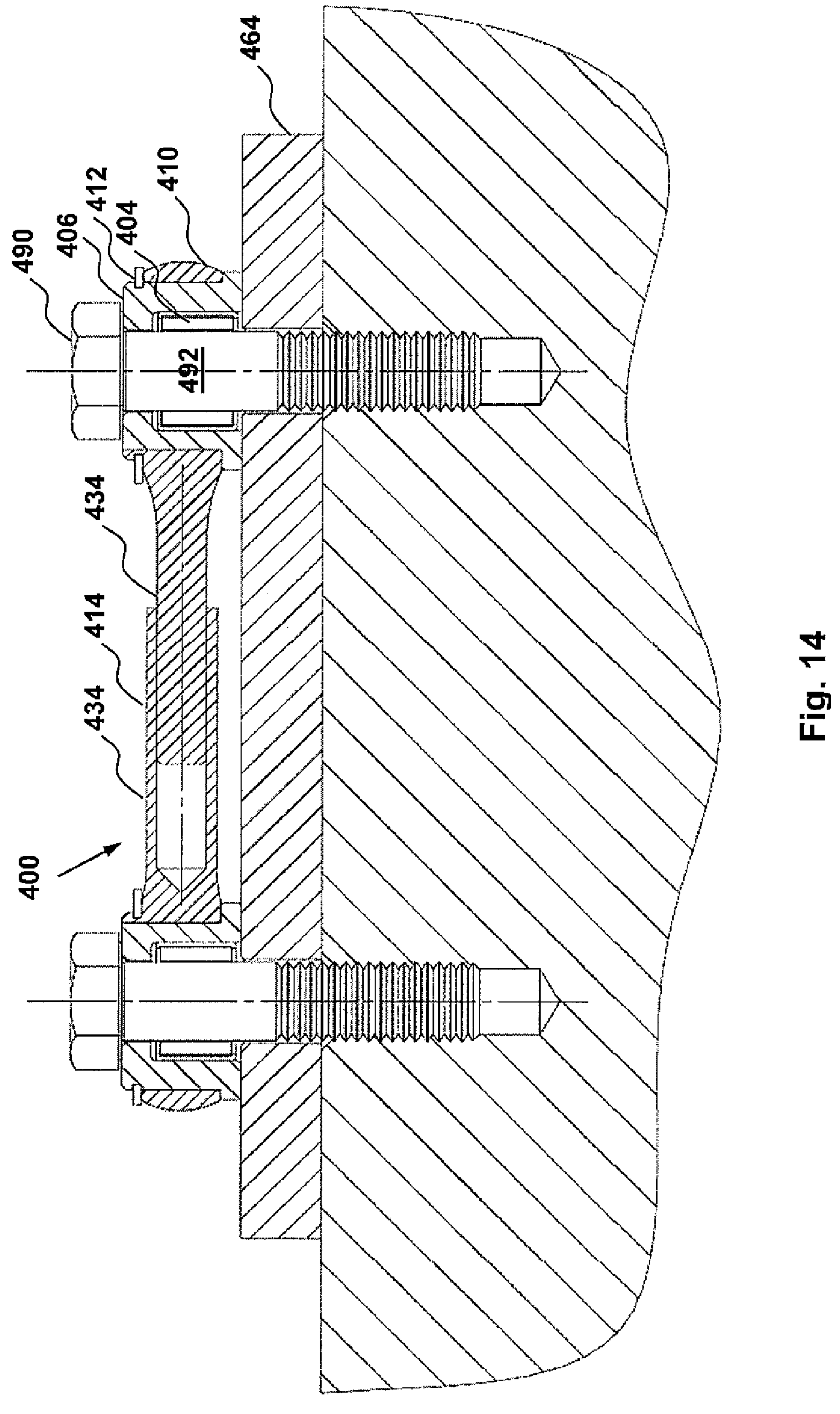
FIG. 14 is a cross-sectional view of a fastener restraint assembly of FIG. 12, in use.

In the embodiments of FIGS. 1-11 rotational couplings 28, 128, 228, 328 of fastener restraint assemblies 10, 100, 200, 300, are mounted above or atop a fastener to be restrained. However, as will be appreciated, the rotational coupling could similarly be mounted beneath the head of a fastener to be restrained. To this end, FIGS. 12-14 depict yet another fastener restraint assembly 400, exemplary of a further embodiment of the present invention. Fastener restraint assembly 400 includes an engagement fitting 416 in the form of a clutch housing 402 retaining rotational coupling in the form of a roller clutch 404 to be mounted beneath the heads of fasteners 490*a* and 490*b* (individually and collectively fasteners 490) on a substrate 464. Engagement fitting 416, unlike engagement fittings 16, 116, 216 and 316, includes roller clutch 404 that engages shaft 492 of fasteners 490, directly. Fasteners 490 may be fastened/loosened by rotating fasteners 490 about axis 436. In the depicted embodiment, roller clutch 404 frictionally engages an unthreaded portion of shaft 492 to hold shaft 492. Specifically, roller clutch 404 may be formed as a drawn roller clutch, whose rolling elements engage shaft 492 to prevent self loosening.

Fastener restraint assembly 400 further includes a body 406, mounted on the outer annulus of roller clutch 404. In the depicted embodiment, body 406 also has an annular shape, and acts as a clutch housing for roller clutch 404. As will be appreciated body 406 may take any arbitrary shape. Optionally body 406 includes generally flat, machined, top and bottom surfaces 408*a* and 408*b*. Surfaces 408*a* and 408*b* may be formed to provide surface similar or identical to those provided by conventional washers, thereby allowing body 406 to engage the bottom of the heads of fasteners 490 and the top of substrate 464.

Optionally, a casing 410 further engages body 406. Casing 410 may also frictionally engage body 406. Casing 410 terminates in two annular end portions 411*a*, 411*b* having an inner diameter greater than the other diameter of the heads of fastener 490*a*, 490*b*. Alternatively casing 410 could engage a friction surface, notch, hole, or the like on or in body 406. Body 406 may include a flange, preventing body 406 from being removed upwardly from casing 410. Body 406 may be retained in casing 410 by a clip 412.

An anchor member 414 includes a rod 434 that extends from casing 410 to allow casing 410 and the outer hub of rotational coupling 428 to be fixed relative to a stationary point. In the depicted embodiment rod 434 of one anchor member 414 may telescope from a rod 434 of an adjacent casing.

As will be appreciated, casing 410 could be eliminated or otherwise replaced, so that the outer annulus of roller clutch 404 is otherwise interconnected with rod 434.

In use, body 406 may be placed between the head of fastener 490 and the substrate 464 to which fastener 490 is to be affixed. Fastener 490 may be tightened to the desired pre-load. At this stage, outer annulus of roller clutch 404, and thus body 406 may still be freely rotated about axis 436, in the loosening direction of fastener 490, but not in the tightening direction of fastener 490. Bodies 406 may therefore be rotated so that they are aligned allowing rod 434 to be put in place. Casing 410 and rod 434 may therefore be attached to body 406, and be fastened to a stationary point (typically another body 406, about a second fastener), thereby preventing self loosening of fastener 490.

As will now be apparent, many variations to the above embodiments are possible. For example, an engagement fitting like fitting 16, 116, 216 may be mounted to a fastener to be restrained in many ways. For example, such an engagement fitting could be locked to a fastener using a radially extending set screw.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A fastener restraint assembly comprising:

a. an engagement fitting for receiving the shaft of rotational fastener, said rotational fastener comprising a head for turning said rotational fastener, and a shaft having an unthreaded portion, and a threaded portion extending along a fastener axis, said engagement fitting comprising a unidirectional roller clutch, said unidirectional roller clutch, having a surface for frictionally engaging said unthreaded portion of said shaft of said rotational fastener, when received by said engagement fitting, said;

wherein said rotational fastener is affixed to a substrate and said engagement fitting lies between said head of said rotational fastener and said substrate;

b. an anchor member, attachable to a stationary point that is stationary relative to said fastener;

wherein said engagement fitting is connected to said anchor member, to allow uni-directional rotation of said rotational fastener about said fastener axis, to allow rotational tightening of said rotational fastener by turning said head, and to prevent rotation of said rotational fastener in the loosening direction of said fastener as said anchor member is being aligned and attached to said stationary point.

2. The assembly of claim 1, further comprising a second engagement fitting for engaging a second rotational fastener, wherein said anchor member extends between said engagement fitting and said second engagement fitting.

3. The assembly of claim 1, wherein said anchor member extends from said substrate.

4. A fastener restraint assembly for restraining a rotational fastener attachable to a substrate, said rotational fastener having a head to apply an external tightening torque, and a smooth shaft portion, said fastener restraint assembly comprising:

a housing retaining a rotational coupling, said rotational coupling comprising an inner surface, wherein said inner surface of said rotational coupling frictionally engages said smooth shaft portion wherein said rotational fastener is affixed to a substrate and said engagement fitting lies between said head of said rotational fastener and said substrate;

an anchor member, attachable to a point that is stationary relative to said rotational fastener and attachable to said housing, said anchor member preventing rotation of said housing relative to said anchor member once attached to said housing;

said rotational coupling mounted within said housing to allow uni-directional rotation of said rotational coupling in said housing about said fastener axis, to allow rotational tightening of said rotational fastener, and to prevent rotational loosening of said rotational fastener as said anchor member is being attached to said housing.

5. The assembly of claim 4 wherein said rotational coupling is a unidirectional roller clutch.

6. The assembly of claim 5, further comprising a second engagement fitting for engaging a second rotational fastener, wherein said anchor member extends between said engagement fitting and said second engagement fitting.

7. The assembly of claim 6, wherein said anchor member extends from said substrate.

8. A fastener restraint assembly comprising:

a. a first roller clutch mounted in a first housing, said first roller clutch having a surface for receiving a smooth shaft portion of a first rotational fastener for frictionally engaging said smooth shaft portion of said first rotational fastener to allow uni-directional rotation of said first rotational fastener relative to said first housing;

b. a second roller clutch mounted in a second housing, said second roller clutch having a surface for receiving a smooth shaft portion of a second rotational fastener for frictionally engaging said smooth shaft portion of said second rotational fastener to allow uni-directional rotation of said second rotational fastener relative to said second housing;

c. a stiff rod;

wherein said first and second housings may be rotated relative to said first and second fasteners, without loosening said first and second fasteners to allow of said first and second housings by way of said stiff rod.

9. The assembly of claim 8 wherein said housing is mountable below said head and above said substrate.

* * * * *